Sept. 18, 1956      G. W. SCHNITZER      2,763,087
FISH LURE
Filed June 12, 1953
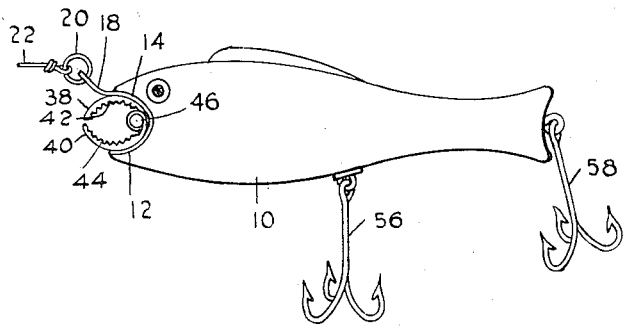
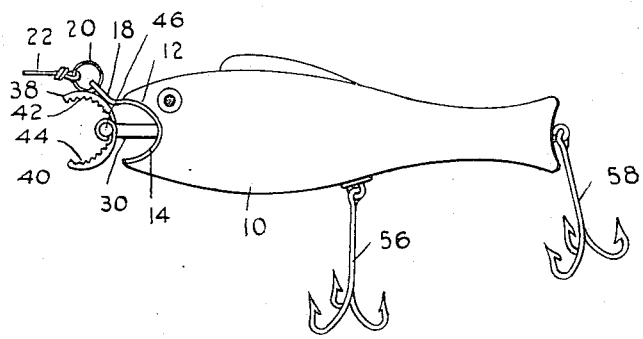
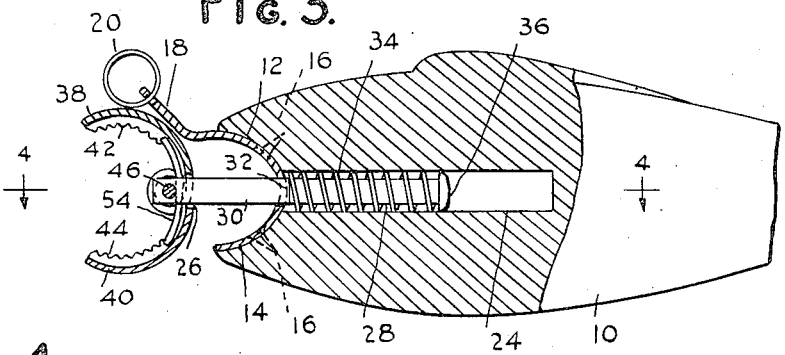
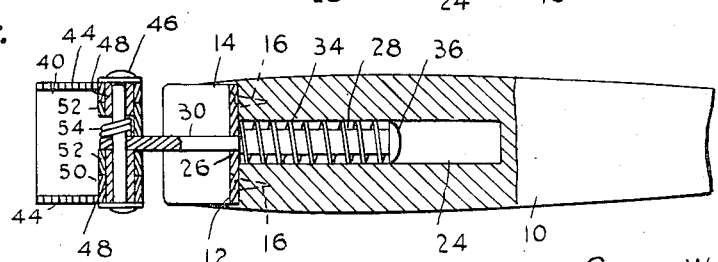
INVENTOR
GEORGE W. SCHNITZER
BY
McMorrow, Berman & Davidson
ATTORNEYS

United States Patent Office 2,763,087
Patented Sept. 18, 1956

2,763,087

FISH LURE

George W. Schnitzer, Kansas City, Mo.

Application June 12, 1953, Serial No. 361,164

2 Claims. (Cl. 43—42.48)

The present invention relates to a fish lure, formed in the shape of an aquatic animal and having a jaw means at one end adapted for gripping bait such as a grasshopper, worm, etc.

A game fish will tend to strike at a smaller fish, such as a minnow, if the smaller fish swims nearby while carrying food in its mouth. In such instances, the game fish strikes at the smaller fish, for the purpose of taking the food away from the smaller fish.

In view of the above, the present invention has as an important object thereof the provision of a fish lure which will include a body shaped to resemble a minnow or other small aquatic animal, said body having toothed jaw means at one end for holding a bait. In this way, it is proposed to form the lure into the simulation of a feeding, small fish, thereby to make the lure more attractive to a game fish than would otherwise be the case.

Another object of importance is to provide a lure as described wherein the means for holding the bait will comprise a pair of readily spreadable jaw members, said jaw members being so shaped as to simulate, with a high degree of faithfulness, the widely spread jaws of a small fish, between which a large piece of bait is held.

Yet another object is to provide a fish lure as described wherein the jaws will be particularly designed to facilitate spreading thereof by a user, thereby to make easier the insertion of a piece of bait, said jaws being adapted to be normally retained in a closed position for the purpose of preventing accidental loss of the bait.

Other objects will appear from the following description, the claims appended thereto, and from the annexed drawings, in which like reference characters designate like parts throughout the several views, and wherein:

Figure 1 is a side elevational view of a fish lure formed in accordance with the present invention;

Figure 2 is a view similar to Figure 1 wherein the jaws have been spread for insertion of a piece of bait therebetween;

Figure 3 is an enlarged, fragmentary view partly in elevation and partly in section, showing the details of construction and of the means for extending the jaws when a piece of bait is to be inserted therebetween;

Figure 4 is a longitudinal sectional view taken substantially on line 4—4 of Figure 3;

The reference numeral 10 has been applied in Figures 1–4 to the body of the fish lure, said body being shaped to simulate an aquatic animal. In the illustrated example the body 10 is shaped to resemble a minnow, and as will be noted, in forming the body, I include an integral, gradually sloped dorsal fin merging into a tail portion.

At the head end of the body, there is formed a deep, wide, arcuate recess 12.

Fixedly mounted in the recess 12 is a support plate 14, said support plate being curved complementarily to the recess and being anchored within the recess by means of nails or equivalent fastening elements 16. At one end, the plate 14 is integral with a forwardly and upwardly projected tongue 18, said tongue being apertured for extension therethrough of an eye 20. A leader 22 or fishing line is secured to said eye, thus to permit the lure to be drawn through the water in simulation of the movements of a fish.

Formed in the body 10, and communicating at one end with the central portion of the recess 12, is a longitudinal bore 24, the plate 14 having an aperture 26 whereby communication is provided between the bore and recess. The aperture 26 is smaller in area than the cross sectional size of the bore 24, and sliding in the aperture is a shank, said shank having an inner end portion 28 integral with an outer end portion 30. Outer end portion 30 is reduced in respect to its cross sectional area, as compared to the cross sectional area of the inner end portion, the outer end portion being slidable within the aperture 26. The formation of the reduced outer end portion 30 defines a shoulder 32 intermediate the opposite ends of said shank, which shoulder will engage against the plate 14, for the purpose of limiting movement of the shank outwardly of the bore 24.

Circumposed about the shank, within the bore, is a spring 34, said spring abutting at one end against the plate 14. As its other end, the spring 34 abuts against a head 36 formed upon the inner end of the shank. The spring is held under compression, and normally tends to bias the shank inwardly of the bore 24, that is, to the right in Figure 3.

Carried by the outer end of the shank, on the reduced end portion 30, is a jaw assembly including relatively spreadable jaws 38, 40. The jaw 38 has two rows of teeth 42, said rows extending along each side edge of the jaw 38 fully from the outer to the inner end of the jaw. Jaw 40 has similar rows 44 of teeth, the teeth of the respective jaws being adapted to bite into piece of bait, such as a grasshopper, worm, etc., not shown, thereby to increase the faithfulness of the simulation of a feeding fish.

The jaws 38, 40 are pivotally mounted upon a pin 46 extending through an aperture formed in the outer end of the reduced end portion 30, said pin 46 extending transversely of the shank. At their inner ends, the jaws are formed with rolled or sleeve-like portions, circumposed about spacer sleeves 48 through which the pin 46 extends. The sleeves 48 are disposed at opposite sides of the reduced end portion 30, as shown in Figure 4, the rolled portions of the jaw 38 being designated by the reference numeral 50 and the rolled portions of the jaw 40 being designated by the reference numeral 52 and being disposed inwardly of the rolled portions 50.

A spring 54 is coiled about the pin 46, intermediate opposite ends thereof, the opposite ends of said spring being engaged against the respective jaws 38, 40. The spring is so tensioned as to normally urge the jaws apart, to the position shown in Figure 3.

In use, the spring 34, tending to expand, will shift the shank inwardly of the bore 24, and will hold the jaws 38, 40 in a closed position, as shown in Figure 1. The recess 12 is so proportioned, in this regard, as to bias the jaws to a closed position, when the spring 34 is permitted to expand. As a result, the bait will be securely held between the jaws 38, 40, thus permitting use of the fish lure in the manner previously discussed herein. When it is desired to replenish the bait, it is merely necessary that the jaw assembly be pulled outwardly from the body, as shown in Figures 2–4. The spring 34 is now placed under compression, and when the jaws 38, 40 clear the recess 12, the spring 54 will be permitted to expand, biasing the jaws to their spread or open position.

The body 10 can, of course, be provided with any number of hooks, and these hooks can be of any type desired. Preferably, a treble hook 56 is secured to the underside of the body 10, medially between the opposite ends thereof, and a second treble hook 58 is secured to the tail.

It is an important characteristic of the invention that the jaws simulate closely the jaws of a real fish. It is also to be noted that when the jaws are in their closed position, an open space is defined therebetween, within which space a piece of bait may be inserted. This adds to the realism of the simulation of a feeding fish.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A fish lure comprising a body shaped as a bait fish and having in its head end a forwardly opening recess simulating the mouth of a fish; fish hooks carried by the body; a support plate overlying and fixedly secured to the wall of said recess and having a substantially centrally disposed aperture formed therein; means on said support plate for connecting a fish line thereto; a shank axially slidable within the body and having one end protruding therefrom and projecting through the aperture into the recess; a pair of jaws pivotaly connected to said end of said shank, said jaws being shaped to close about a piece of fish bait, and being swingable about their pivotal connection toward and away from one another between an open, bait-piece-releasing position and a closed bait-gripping position, said jaws in their closed position being confined for a substantial part of their lengths within the recess with the parts of the jaws disposed in the recess being in engagement with the support plate over the full area of the portion of the support plate within the recess; resilient, yielding means interposed between the support plate and said shank and tensioned to normally bias the shank axially in a direction to draw the jaws into said recess, the support plate having portions extending in the path of the jaws on movement of the jaws into the recess to provide cam surfaces for camming the jaws toward one another.

2. A fish lure comprising a body shaped as a bait fish and having in its head end a forwardly opening recess simulating the mouth of said fish; a support plate overlying and fixedly secured to the wall of said recess and having a substantially centrally disposed aperture formed therein, said support plate at one end thereof being formed with an integral extension projecting forwardly out of the recess and having an opening to provide means for connecting a fish line to the body; a shank axially slidable within the body and having one end projecting through said aperture into the recess; a pair of jaws pivotally connected to said end of said shank, said jaws being shaped to close about a piece of fish bait, and being swingable about their pivotal conection toward and away from one another between an open, bait-piece-releasing position and a closed, bait-gripping position, said jaws in their closed position being confined for a substantial part of their lengths within the recess with the parts of the jaws disposed in the recess being in engagement with the support plate over the full area of the portion of the support plate within the recess; resilient, yielding means interposed between the support plate and said shank and tensioned to normally bias the shank axially in a direction to draw the jaws into said recess, the support plate having portions thereof extending in the path of the jaws on movement of the jaws into the recess to provide cam surfaces for camming the jaws toward one another; resilient, yielding means interposed between the jaws normally tending to bias the same to their open positions; and fish hooks carried by the body.

References Cited in the file of this patent

UNITED STATES PATENTS

| | | |
|---|---|---|
| 754,349 | Scott | Mar. 8, 1904 |
| 856,867 | Hayward | June 11, 1907 |
| 1,324,109 | Dutes | Dec. 9, 1919 |
| 2,074,542 | Eldridge | Mar. 23, 1937 |
| 2,425,587 | Zuravsky | Aug. 12, 1947 |
| 2,476,553 | L'Huillier | July 19, 1949 |
| 2,497,846 | Burroughs | Feb. 21, 1950 |

FOREIGN PATENTS

| | | |
|---|---|---|
| 771,120 | France | July 16, 1934 |